(No Model.)
M. PESANT.
MACHINE FOR CLEANING AND SCRAPING LEAVES.
No. 250,746. Patented Dec. 13, 1881.
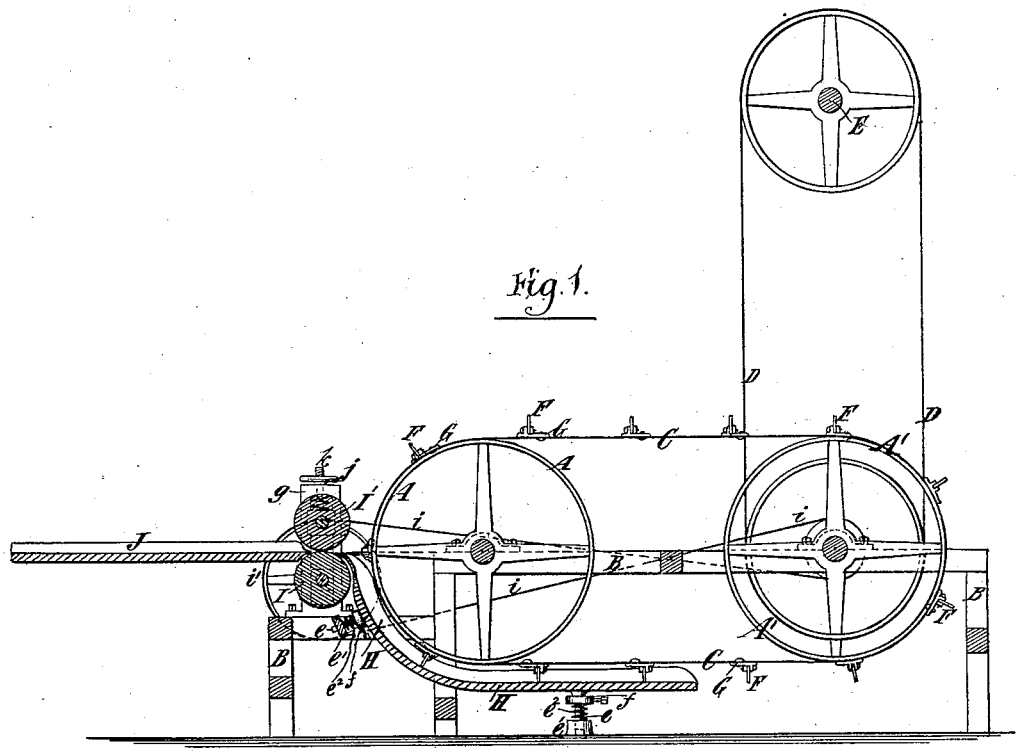
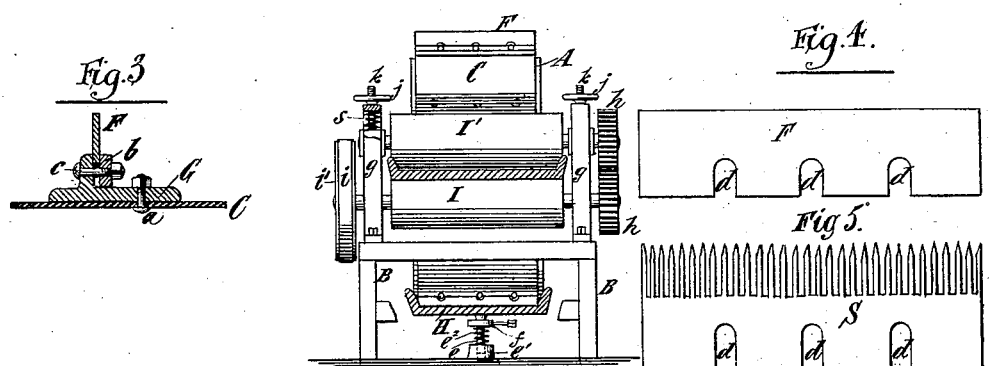
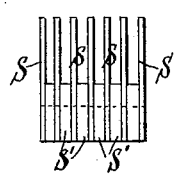
Witnesses:
Fred T. Haynes
Louis M. Whitehead
Inventor:
Manuel Pesant
by his Attorneys
Brown & Brown

UNITED STATES PATENT OFFICE.

MANUEL PESANT, OF NEW YORK, N. Y.

MACHINE FOR CLEANING AND SCRAPING LEAVES.

SPECIFICATION forming part of Letters Patent No. 250,746, dated December 13, 1881.

Application filed April 8, 1881. (No model.)

*To all whom it may concern:*

Be it known that I, MANUEL PESANT, of the city, county, and State of New York, have invented certain new and useful Improvements in Machines for Cleaning and Scraping Leaves and other Fibrous Materials, of which the following is a specification.

The object of my invention is to provide an improved machine for scraping leaves and other fibrous materials to remove from them the gummy and resinous matters which would render the fiber produced from them of poor quality; and to this end the invention consists, essentially, in a machine comprising two rotary pulleys or drums, an endless belt upon said pulleys or drums, provided with scraping blades, combs, or brushes projecting from its face, a curved apron, in close proximity to which said scraping blades, combs, or brushes are carried by said belt, and preferably also feeding and holding rollers which rotate at a much slower speed than said scraping-blades, and between which the leaves or other materials to be operated on are fed. The feeding and holding rollers move the leaves or other materials slowly forward, while their portions which project beyond the rollers rest upon the curved apron and are acted upon by the scraping blades, combs, or brushes, and they also prevent the leaves or materials from being drawn rapidly forward by the action of the said blades or brushes. The employment of the belt carrying the scraping blades, combs, or brushes in combination with the apron is very desirable, because the belt forms a yielding base for said blades, combs, or brushes, and causes them to operate on the materials upon the apron with a yielding pressure. The apron may with advantage be supported entirely by springs, so as to yield readily at any part. The ends of the leaves or other materials which leave the rollers last are not properly scraped, because as soon as released said leaves or materials are carried over the apron by the scraping blades or brushes; and I provide means for raising the upper feed and holding roller, when necessary, to permit of the leaves or materials being held in the hands while their unfinished ends are presented to be acted upon by the scraping blades, brushes, or combs.

The invention also consists in a novel construction of the brushes employed in a machine of the kind above described.

In the accompanying drawings, Figure 1 represents a side view and partial section of a machine embodying my invention. Fig. 2 represents an end view thereof, also partly in section. Figs. 3 and 4 are detail views, showing the manner in which the scraping-blades are secured to the endless belt which carries them. Fig. 5 is a side view of a comb for use in my machine; and Fig. 6 is an end view of a brush, also embodying my invention.

Similar letters of reference designate corresponding parts in all the figures.

A A' designate two pulleys or drums, placed at a little distance apart, side by side, and the shafts of which are supported in suitable bearings in a frame-work, B.

C designates an endless belt, of leather, metal, or other material, upon the said pulleys or drums; and D designates a belt, by which motion is transmitted from a driving-shaft, E, to the pulley or drum A', and through the belt C to the pulley or drum A.

F designates scraping-blades, secured at a little distance apart to the belt C and projecting from the face thereof. These scraping-blades are secured to the belt by means of pieces G, which are secured to the belt by button-head bolts $a$, and to which the blades F are clamped by means of a bar or piece, $b$, and bolts $c$, as seen clearly in Fig. 3. The blade F is constructed with slots or recesses $d$, as seen in Fig. 4, and by loosening the bolts $c$ provision is afforded for adjusting the blades to cause them to project more or less from the belt, in which position they may be secured by tightening the bolts $c$.

The two pulleys A A' may have recesses in their faces, which receive the button-heads of the bolts $a$, and by them the belt C is geared to the said pulleys, so that there is no chance of the belt slipping.

In lieu of the scraping-blades, brushes or combs might be attached to the belt in a similar manner.

Fig. 5 represents a face view of one of the toothed plates, which I may employ as a comb, and which consists of a plate, S, of brass or other thin plate metal, provided in one edge with notches $d$, adapted to fit over the bolts $c$, and having in its opposite edge numerous saw-cuts, forming a number of teeth, which may be fine or coarse, in accordance with the distance apart of the said cuts.

In Fig. 6 I have represented a brush which is composed of a number of toothed plates, S, similar to that shown in Fig. 5, except that they are preferably thinner and divided or separated by pieces or strips of metal, S'. The said toothed plates S' separating them are provided with notches like the notches $d$, Fig. 5, receiving the bolts $c$, and hence any convenient number of toothed plates may be bolted together and to the belt C, for making a brush of the desired width.

H designates an apron, the face of which is curved to correspond to the path traveled by the edges of the scraping-blades F, and the curved portion of the apron is concentric with the pulley A. Upon the back of the apron H are pins or studs $e$, which fit in suitable sockets, $e'$; and $e^2$ designates springs by which the apron is supported or kept in place with a yielding pressure. Upon the pins or studs $e$ are collars $f$, which may be adjusted up and down thereon and secured by set-screws, and which therefore cause the springs $e^2$ to act with more or less force upon the apron to press it upward.

As here represented, the lower end of the apron H projects considerably beyond the pulley A, and the belt traveling over such projecting portion permits the blades, combs, or brushes to yield.

It will also be observed that, if the belt be made of rubber, leather, or other similar materials of which belts are frequently made, the belt will form a yielding base for the blades, combs, or brushes, and cause them to act upon the materials upon the apron with a yielding pressure, even when the blades, combs, or brushes are passing round the pulley A.

It will also be observed that the apron is supported entirely by springs, and hence may yield readily at any part.

I I' designate rollers mounted in bearings in standards or housings $g$, and geared together by wheels $h$, so as to rotate in unison. Motion may be imparted to them by a cross-belt, $i$, passing over a small pulley on the shaft of the drum or pulley A', and a larger pulley, $i'$, upon the shaft of the lower roller, I.

The leaves or other materials to be operated on are fed from a table, J, between the rollers I I', and as fast as they are fed forward by the rollers they pass down upon the apron H and are scraped by the scraping-blades F. At the same time, however, the said rollers prevent the leaves or other materials from being drawn forward by the scraping-blades. As soon as the ends of the leaves or other materials leave the feed and holding rollers I I' they are carried rapidly over the apron by the scraping-blades, and hence said ends are not properly scraped. In order to complete the scraping of these ends, I raise the upper roller, I', against the pressure of springs $s$ by means of hand-wheels $j$, screw-threaded to engage with stems or screws $k$, projecting upward from the boxes in which said upper roller runs, and the leaves or other materials may then be held by the hands while their unfinished ends are thoroughly scraped.

By my invention I provide a machine for doing expeditiously and thoroughly the work for which it is intended.

If desirable, a knife or stationary scraping-blade might be fixed transversely in the head of the apron H to scrape the backs of the leaves or other materials as they are fed forward.

In order to keep the belt C tight, the bearings for the shaft of the pulley A' might be made adjustable to provide for moving them, and with them the pulley A', away from the pulley A.

The rollers I I' might be grooved or fluted longitudinally, if desired.

What I claim as my invention, and desire to secure by Letters Patent, is—

1. In a machine for scraping leaves and other fibrous materials, the combination, with two pulleys and an endless belt carrying scraping blades, combs, or brushes, of a curved apron, past which said blades, combs, or brushes are carried, whereby a yielding base for said blades, combs, or brushes is afforded by said belt, and they are caused to operate upon the materials fed over said apron with a yielding pressure, substantially as specified.

2. In a machine for scraping leaves and other fibrous materials, the combination, with two pulleys and an endless belt carrying scraping blades, combs, or brushes, of a curved apron, past which said blades, combs, or brushes are carried, and which is supported entirely by springs, so as to yield readily at any part, substantially as specified.

3. In a machine for scraping leaves and other fibrous materials, the combination of two pulleys, an endless belt carrying scraping blades, combs, or brushes, a curved apron, past which said blades, combs, or brushes are carried, feeding and holding rollers, between which said leaves or materials are fed forward, and means for adjusting one roller away from the other to render said rollers inoperative, substantially as and for the purpose specified.

4. A brush for a machine for scraping leaves and other fibrous materials, composed of a number of toothed metal plates arranged side by side, and dividing or separating pieces inserted between said plates, substantially as specified.

M. PESANT.

Witnesses:
T. J. KEANE,
ED GLATZMAYER.